United States Patent [19]
Wood

[11] Patent Number: 5,040,563
[45] Date of Patent: Aug. 20, 1991

[54] ADJUSTABLE AIR PRESSURE VALVE

[75] Inventor: Mark W. Wood, Jackson, Tenn.

[73] Assignee: The DeVilbiss Company, Jackson, Tenn.

[21] Appl. No.: 550,131

[22] Filed: Jul. 9, 1990

[51] Int. Cl.5 .............................. F16K 17/06
[52] U.S. Cl. ............................ 137/530; 137/524; 137/535; 239/126
[58] Field of Search ............ 137/524, 530, 535, 224; 239/126

[56] References Cited

U.S. PATENT DOCUMENTS

| | | | |
|---|---|---|---|
| 1,503,663 | 8/1924 | Price | 137/535 X |
| 1,582,928 | 5/1926 | Hoag | 137/530 X |
| 2,735,669 | 2/1956 | Seiler | 137/530 X |

FOREIGN PATENT DOCUMENTS

| | | | |
|---|---|---|---|
| 1006562 | 4/1952 | France | 137/535 |
| 1245732 | 9/1971 | United Kingdom | 137/530 |

*Primary Examiner*—Robert G. Nilson
*Attorney, Agent, or Firm*—MacMillan, Sobanski & Todd

[57] ABSTRACT

An adjustable air pressure valve for placement in a compressed air hose. Positioning a knob determines the pressure exerted by a spring on a valve member which allows air above a predetermined pressure to escape from the hose to the atmosphere. The knob is incrementally moveable to provide incremental pressure changes.

5 Claims, 2 Drawing Sheets

ADJUSTABLE AIR PRESSURE VALVE

TECHNICAL FIELD

The invention relates to valves and regulators and more particularly to an improved air pressure valve suitable for adjusting the output pressure from a continuously operating air compressor which is connected directly to an air supply line.

BACKGROUND ART

There are two common methods for operating air compressors to obtain a desired output air pressure. In one method, an intermittently operated air compressor is mounted on or is connected to an air tank. Compressed air is supplied from the compressor to the tank and from the tank through a hose to an air consuming tool. A pressure switch cycles the air compressor on and off to limit the compressed air pressure in the tank to a predetermined range. The pressure switch is adjustable to obtain a pressure meeting the requirements of the tool or other appliance operated from the compressed air.

According to another method, an air compressor is continuously operated. The compressor output is applied directly to an air output line which connects to an air consuming tool or appliance, such as a paint spray gun. An air pressure regulator valve is mounted at the compressor for limiting the output pressure in the air line. The valve is adjusted to set the maximum line pressure and bleeds any excess compressor output air to the atmosphere once the set pressure is reached. This method is often used for smaller capacity "oilless" compressors which are designed for continuous operation and for operating tools having limited air volume requirements.

Improvements could be made in the pressure limiting valve used in the latter method. A tool may be connected through a relatively long air line or hose to the compressor. For example, a compressor sitting on the ground may be connected to a spray gun or to a pneumatic nailer being used on the roof of a building. When the air flow through the tool is changed, there will be a change in the pressure drop along the air supply hose connected to the tool. Since the pressure adjusting valve is mounted on the compressor, the operator must walk back to the compressor whenever adjustment of the operating pressure at the tool is needed. Further, when the valve is mounted on the compressor, the valve projects from a side or top of the compressor. There is a risk of damage to the rigidly mounted valve during shipment and use of the compressor.

DISCLOSURE OF INVENTION

According to the invention, an improved adjustable pressure regulating valve for bleeding excess air to the atmosphere is designed for mounting directly in a flexible air hose. The valve may be located near the end of the hose near an air consuming tool to facilitate air pressure adjustment while using the tool. Since the air pressure is adjusted near the tool, pressure drop along the air supply line does not significantly affect the pressure at the tool as the air flow through the tool is changed. Finally, since the pressure regulating valve is not rigidly attached to the compressor, the risk of damage during shipment or use is reduced.

The in line valve includes a T-shaped fitting forming air inlet and air outlet connections for securing to the air hose and an air vent opening. A valve disk covers the air vent opening. A flat spring is mounted on a valve actuator with the center of one side of the spring pressing the valve disk against the vent opening. The valve actuator is mounted to pivot from adjacent one end of the spring. An adjustable slide controls the pressure exerted by the spring on the valve disk to determine the air pressure required to lift the valve disk from the vent opening. The slide is retained in a notched groove. Movement of the slide between adjacent notches changes the line air pressure by predetermined increments, for example, up or down by 5 psi increments.

According to the invention, an improved air pressure limiting valve is provided for mounting in an air line adjacent an air consuming tool.

Other objects and advantages of the invention will be apparent from the following detailed description and the accompanying drawings.

BEST MODE FOR CARRYING OUT THE INVENTION

Figure 1:
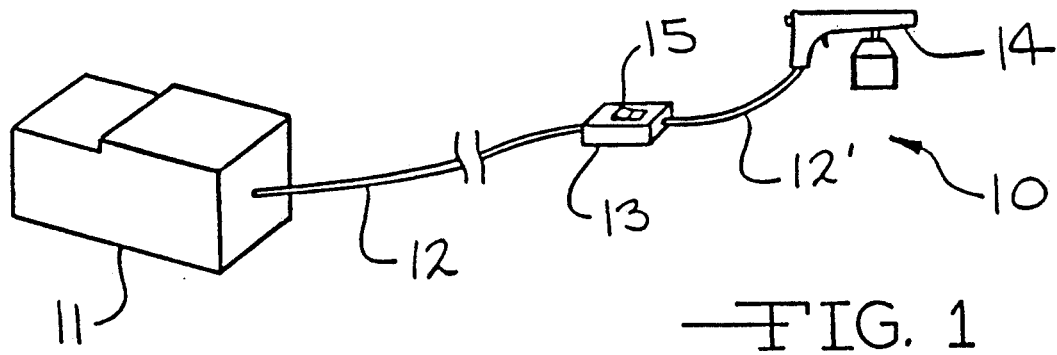
FIG. 1 is a diagrammatic view illustrating an exemplary system including a continuous duty air compressor connected through an air line and a pressure adjusting valve according to the invention to a paint spray gun.

Referring to FIG. 1, an exemplary system 10 is illustrated including an air compressor 11 connected through an air hose 12 and an adjustable air pressure valve 13 according to the invention to operate a paint spray gun 14. The compressor 11 is of the type which operates continuously, outputting compressed air at a substantially constant rate. The spray gun 14 will have an air consumption which varies from zero when the spray gun 14 is off to a maximum when the spray gun 14 is on and internal air flow control valves (not shown) in the spray gun 14 are fully open. A typical spray gun 14 will include an atomization air valve for adjusting atomization air flow to a nozzle and a pattern shaping air valve for adjusting pattern shaping air to an air cap at the nozzle. Pattern shaping air can be varied from zero for a producing round spray pattern to a maximum flow for producing a flat fan shaped pattern. Thus, there may be a considerable variation in the compressed air requirements for the spray gun 14.

According to the invention, the air pressure valve 13 is adjustable to establish the maximum air pressure in a section 12' of the air hose 12 adjacent the spray gun 14, or other air consuming tool attached to the hose section 12'. A sliding knob 15 on the valve 13 is positioned to set the maximum air pressure in the hose section 12'. If the compressor 11 delivers a greater air flow to the hose 12 than is required by the spray gun 14, the air pressure will build up at the valve 13 to the predetermined pressure set by the position of the sliding knob 15, and any excess air flow is discharged through the valve 13 to the atmosphere. Since the valve 13 is located near the spray gun 14, it is easily adjusted by the operator. Further, the spray gun will not see variations in the air pressure caused by a pressure drop along the hose 12, as occur when a pressure adjusting valve is located at the compressor 11. The compressor 11 will see a constant back pressure in the air hose 12 because of the valve 13 located adjacent the spray gun 14.

Figure 2:
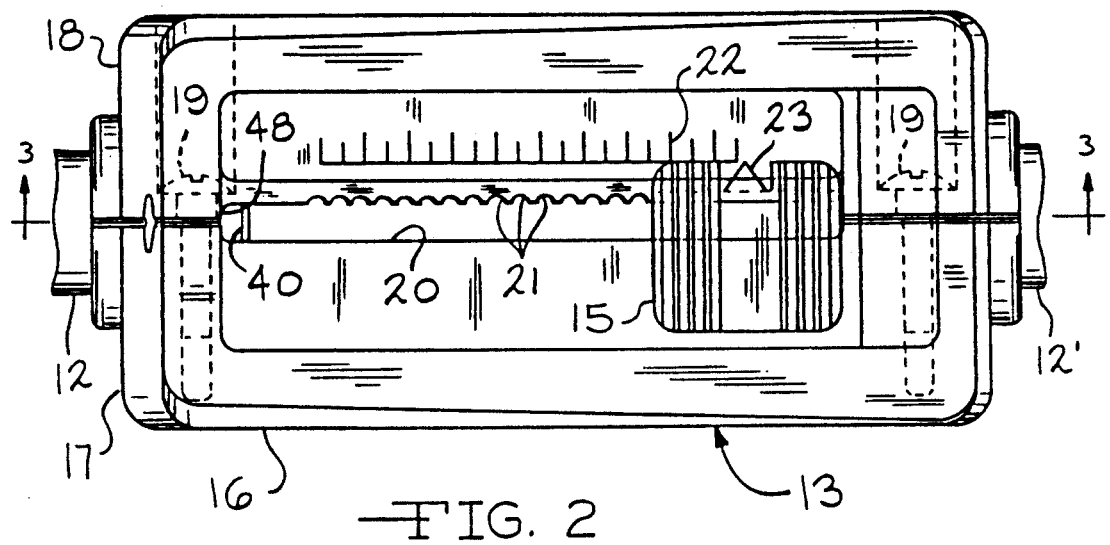
FIG. 2 is a top plan view of the pressure adjusting valve of the invention.
Figure 3:
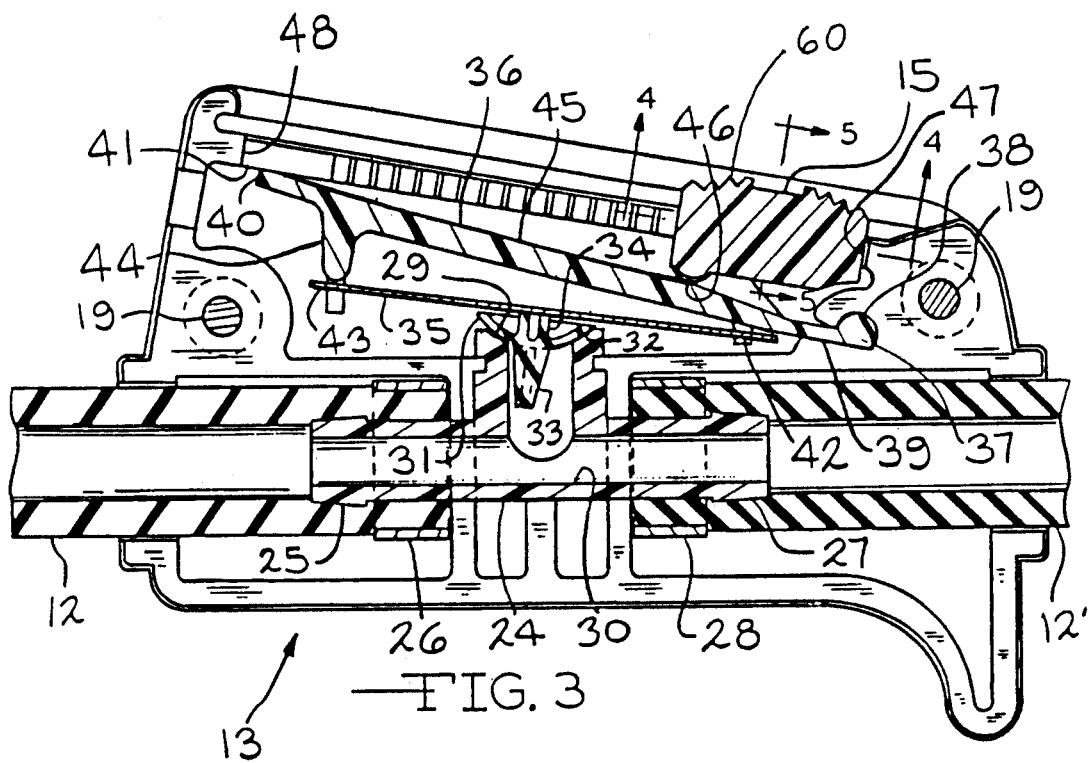
FIG. 3 is a cross sectional view through the pressure adjusting valve as taken along line 3—3 of FIG. 2.

Details of the adjustable air pressure valve 13 are shown in FIGS. 2 and 3. The valve 13 has a molded plastic housing 16 formed from two housing sections 17 and 18. The housing sections 17 and 18 are held together by a plurality of screws 19. A slot 20 is formed between the housing sections 17 and 18 for receiving and retaining the sliding knob 15. The side of the slot 20 formed in the housing section 18 has serrations or notches 21 to form distinct stops for the knob 15, as will be discussed below in greater detail. As the knob 15 is moved from one notch 21 to an adjacent notch 21, there will be a predetermined change in the air pressure, for example, a 5 psi increase or decrease between adjacent notches 21, depending on the direction in which the knob 15 is moved. A scale 22 may be marked on one of the housing sections, for example, section 18, and the knob 15 may include a pointer 23 for indicating the hose pressure or for indicating relative pressure changes in the hose.

A T-shaped fitting 24 is clamped between the housing sections 17 and 18. The fitting 24 has a barbed end 25 to which the air hose 12 is secured by a clamp 26 and has a barbed end 27 to which the air hose section 12' is secured by a clamp 28. The fitting 24 defines a valve seat 29. An interior passage 30 in the fitting interconnects the air hose 12, the hose section 12' and the valve seat 29. A valve member 31 has a spherical surface 32 which is seated on the valve seat 29. The valve member 31 has a member 33 projecting from the center of the surface 32 into the passage 30 for maintaining alignment of the valve member 31 with the seat 29. Opposite the member 33, a member 34 is provided for engaging a flat spring 35.

A valve actuator 36 is cantilevered from a slot 37 formed between the housing sections 17 and 18. The actuator 36 has a shaped end 38 which is retained in the slot 37. Adjacent the slot 37, the actuator 36 has a thin resilient section 39. The actuator 36 may be bent or deflected toward the valve member 31 about the section 39. The actuator 36 is formed from a resilient plastic which urges an end 40 of the actuator 36 to pivot in a direction about the section 39 away from the valve seat 29 and towards an interior housing surface 41 adjacent the slot 20. The flat spring 35 has an end 42 which is secured to the actuator 36 adjacent the resilient section 39. An opposite end 43 of the spring rests against a flange 44 on the actuator 35. When the valve member 34 presses against a center region of the spring 35 and the spring 35 deflects, the spring end 43 is free to slide on the flange 44.

The valve actuator 36 has a surface 45 which is angled toward the housing surface 41. The sliding knob 15 has a rounded projection 46 which presses against and moves along the actuator surface 45. As the knob 15 is moved from an end 47 of the slot 20 towards an end 48 of the slot 20, the knob projection 46 deflects the actuator surface 45 to pivot the actuator 36 about the resilient section 39. As the actuator 36 is pivoted, the spring 35 exerts a greater force on the valve member 31. Consequently, a greater hose air pressure is required to lift the valve member 31 from the seat 29. The spring rate for the spring 35 and the amount of pivotal movement of the actuator 36 per notch 21 determine the pressure change between notches. The spring rate of the spring 35 is selected to provide a desired operating pressure range for the valve 13. By using a spring 35 made from a flat rolled spring material, a more accurate spring rate may be obtained then with a conventional coiled or other complex shaped spring. Consequently, the accurate flat spring 35 improves the pressure regulation accuracy.

Figure 4:
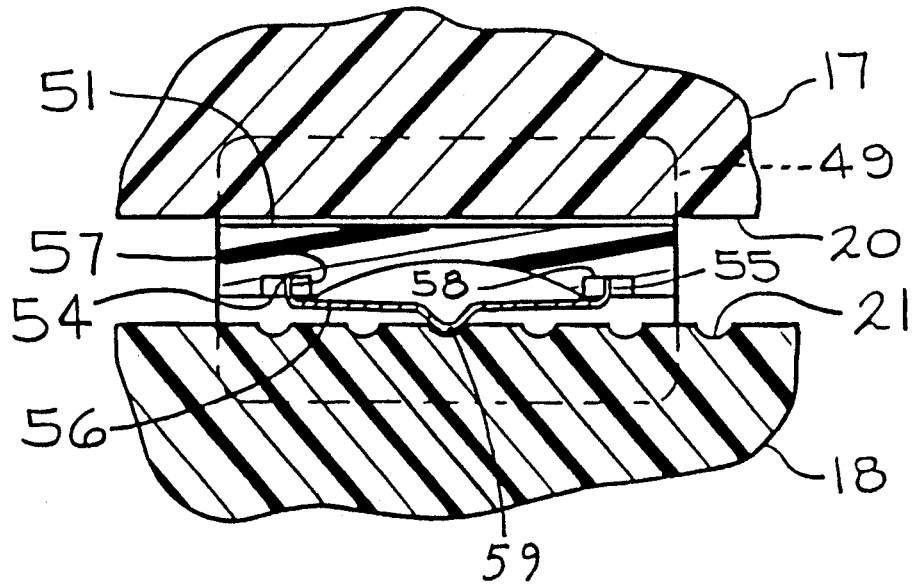
FIG. 4 is an enlarged fragmentary cross sectional view through the valve slide as taken along line 4—4 of FIG. 3.
Figure 5:
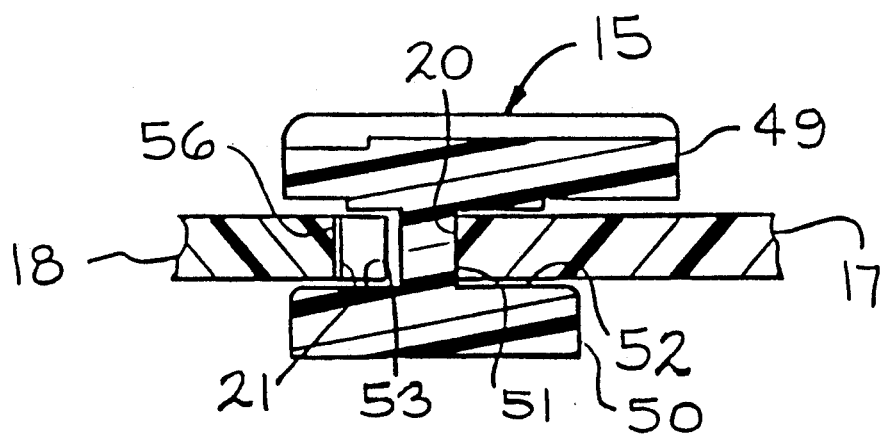
FIG. 5 is an enlarged fragmentary cross sectional view through the valve slide as taken along line 5—5 of FIG. 3.

FIGS. 3, 4 and 5 show details of the sliding knob 15 and the housing slot 20. The knob 15 has an upper section 49 and a lower section 50 which are interconnected by a web 51. The housing section 17 extends into a slot 52 formed between the sections 49 and 50 and the web 51 and the housing section 18 extends into a slot 53 between the sections 49 and 50 and the web 51. Ends 54 and 55 of a flat spring 56 are retained in grooves 57 and 58, respectively, in the side of the web 51 in the slot 53. A ridge 59 is formed in the center of the spring 56 between the ends 54 and 55. The ridge 56 is positioned to press against the side of the slot 20 in the housing section 18 and to project into the notches 21. An upper surface 60 on the upper knob section 49 is preferably knurled to facilitate moving the knob 15. When an operator presses on the knurled surface 60 to move the knob 15, the spring ridge 59 moves from notch 21 to notch 21. When the operator lets go of the knob 15, the ridge 59 is retained in a notch 21 to prevent the knob 15 from moving and causing the selected operating pressure to change.

From the above description, it will be apparent that sliding the knob 15 towards the slot end 48 will increase the pressure exerted by the spring 35 on the valve member 31 and, consequently, increase the air pressure in the hose 12 and in the hose section 12'. Conversely, moving the knob 15 towards the slot end 47 will decrease the pressure exerted on the valve member 31 and the air pressure will decrease. It will be apparent to those skilled in the art that various modifications and changes may be made in the adjustable air pressure valve 13 without departing from the spirit and the scope of the following claims.

What is claimed is:

1. An adjustable air pressure valve for insertion in an air hose comprising a housing, a fitting in said housing including inlet means and outlet means for connecting said valve in the air hose, a valve seat formed on said fitting, said fitting having a passage interconnecting said inlet means, said outlet means and said valve seat, a valve member engaging said valve seat, means in said housing for exerting an adjustable pressure on said valve member to establish the maximum air pressure in the air hose, and wherein said adjustable pressure exerting means includes a valve actuator having a first end secured to said housing and having a free second end, said actuator having a resilient section adjacent said first end, a spring positioned between said actuator and said valve member, and means for pivoting said actuator about said resilient section to adjust the force exerted by said spring on said valve member.

2. An adjustable air pressure valve for insertion in an air hose, as set forth in claim 1, wherein said spring is a flat spring.

3. An adjustable air pressure valve for insertion in an air hose, as set forth in claim 2, wherein said pivoting means comprises a slot formed in said housing, and a knob mounted to slide in said slot, said knob pivoting said actuator as said knob slides in said slot.

4. An adjustable air pressure valve for insertion in an air hose, as set forth in claim 3, and further including means for retaining said knob in incrementally spaced positions for providing an incrementally adjustable maximum air pressure in the hose.

5. An adjustable air pressure valve for insertion in an air hose, as set forth in claim 4, wherein said retaining means includes a plurality of spaced notches formed in said groove, and a second spring mounted on said knob, said second spring having a ridge positioned for sequentially engaging said notches as said knob is moved in said slot.

* * * * *